(12) United States Patent
Morrissey et al.

(10) Patent No.: US 8,953,761 B2
(45) Date of Patent: Feb. 10, 2015

(54) SYSTEM, METHOD, AND APPARATUS FOR INSERTING CALLER ID INFORMATION INTO A DIGITAL VIDEO SIGNAL

(75) Inventors: Michael Morrissey, Overland Park, KS (US); Mohit Mathur, Olathe, KS (US); Clinton Smoyer, Raymore, MO (US); Jade Kerr, Kansas City, KS (US); Curtis Tucker, Lees Summit, MO (US); Andrew Cook, Lenexa, KS (US)

(73) Assignee: CenturyLink Intellectual Property LLC, Denver, CO (US)

( * ) Notice: Subject to any disclaimer, the term of this patent is extended or adjusted under 35 U.S.C. 154(b) by 802 days.

(21) Appl. No.: 12/346,584

(22) Filed: Dec. 30, 2008

(65) Prior Publication Data

US 2010/0166164 A1 Jul. 1, 2010

(51) Int. Cl.
| | | |
|---|---|---|
| *H04M 1/56* | (2006.01) | |
| *H04M 15/06* | (2006.01) | |
| *H04N 21/235* | (2011.01) | |
| *H04N 21/435* | (2011.01) | |
| *H04N 21/4402* | (2011.01) | |
| *H04N 21/488* | (2011.01) | |
| *H04N 21/81* | (2011.01) | |

(52) U.S. Cl.
CPC ............. *H04M 15/06* (2013.01); *H04N 21/235* (2013.01); *H04N 21/435* (2013.01); *H04N 21/440236* (2013.01); *H04N 21/4882* (2013.01); *H04N 21/8126* (2013.01)
USPC .................................. 379/142.04; 379/142.17

(58) Field of Classification Search
USPC ............. 455/53.1, 66.1, 70, 90.2, 140, 412.1, 455/414.1, 550.1, 557, 463, 566, 415, 417, 455/420; 345/473–475, 687–688, 949, 956, 345/594, 601–602, 650, 661, 676, 689, 522, 345/534–532, 536–541, 547, 532–534; 340/7.56; 379/93.23, 142.06, 142.07, 379/142.04, 142.01, 142.17; 386/281; 348/14.02, 14.07, 589; 725/131, 147, 725/139, 35, 40, 62, 122, 151, 153, 34, 106, 725/110, 117, 136

See application file for complete search history.

(56) References Cited

U.S. PATENT DOCUMENTS

| | | | | |
|---|---|---|---|---|
| 6,016,380 | A * | 1/2000 | Norton | 386/281 |
| 6,052,444 | A * | 4/2000 | Ferry et al. | 379/93.35 |
| 6,738,427 | B2 * | 5/2004 | Zetts | 375/240.28 |
| 6,850,250 | B2 * | 2/2005 | Hoch | 345/632 |
| 8,060,068 | B1 * | 11/2011 | Mangal | 455/415 |
| 8,213,919 | B1 * | 7/2012 | Bluhm et al. | 455/415 |
| 2003/0190024 | A1 * | 10/2003 | Ju | 379/142.16 |

(Continued)

OTHER PUBLICATIONS

Charles Poynton, A Technical Introduction to Digital Video, J. Wiley, chapter 21, Jan. 17, 1996.*

*Primary Examiner* — Vivian Chin
*Assistant Examiner* — Friedrich W Fahnert
(74) *Attorney, Agent, or Firm* — Swanson & Bratschun, L.L.C.

(57) ABSTRACT

Embodiments of a method, system, and apparatus for inserting caller identifying information into a video signal includes receiving a digital video stream and receiving caller identifier information from an incoming call associated with a calling device. The method further includes converting the caller identifier information into caller identifying textual information, and inserting the caller identifying textual information into the digital video stream using a visual timecode video insertion format. The method further includes transmitting the digital video stream with the inserted caller identifying textual information.

20 Claims, 5 Drawing Sheets

(56) References Cited

U.S. PATENT DOCUMENTS

2004/0067042 A1* 4/2004 Hughes, Jr. .................... 386/65
2007/0180485 A1* 8/2007 Dua ............................. 725/114
2008/0225180 A1* 9/2008 Callway et al. ............... 348/725

* cited by examiner

US 8,953,761 B2

SYSTEM, METHOD, AND APPARATUS FOR INSERTING CALLER ID INFORMATION INTO A DIGITAL VIDEO SIGNAL

BACKGROUND OF THE INVENTION

Caller Identification (Caller ID) is a telephone service that transmits caller identification information, such as a caller's phone number to the called party's telephone equipment during the ringing signal or when the call is being set up but before the call is answered. Sometimes, Caller ID may also provide a name associated with the calling telephone number. The called party may then view the Caller ID information on a telephone's display or on a display of a separate attached device. Caller ID often allows the called party to view the identity of the incoming caller without requiring the caller party to answer the call. Based on the caller identification information, the called party can make a decision regarding whether he wishes to answer the incoming call.

BRIEF SUMMARY OF THE INVENTION

An embodiment of a method for inserting caller identifying information into a video signal includes receiving a digital video stream and receiving caller identifier information from an incoming call associated with a calling device. The method further includes converting the caller identifier information into caller identifying textual information, and inserting the caller identifying textual information into the digital video stream using a visual timecode video insertion format. The method further includes transmitting the digital video stream with the inserted caller identifying textual information.

An embodiment of an apparatus for inserting caller identifying information into a video signal includes at least one processor configured to receive a digital video stream, and receive caller identifier information from an incoming call associated with a calling device. The at least one processor is further configured to convert the caller identifier information into caller identifying textual information, and insert the caller identifying textual information into the digital video stream using a visual timecode video insertion format. The at least one processor is further configured to transmit the digital video stream with the inserted caller identifying textual information.

BRIEF DESCRIPTION OF THE DRAWINGS

Illustrative embodiments of the present invention are described in detail below with reference to the attached drawing figures, which are incorporated by reference herein and wherein.

DETAILED DESCRIPTION OF THE INVENTION

Figure 1A:
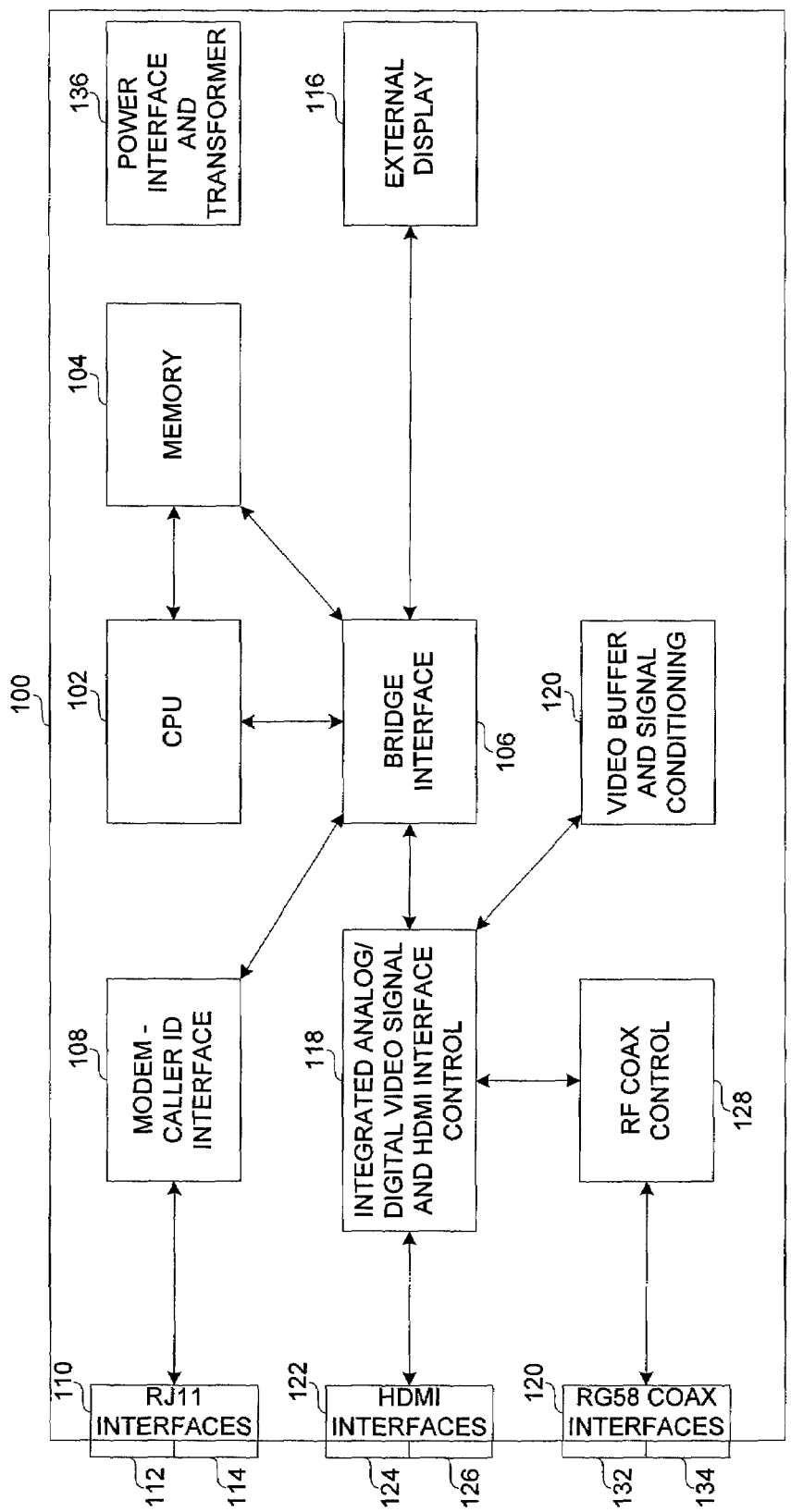
FIG. 1A is an embodiment of a Caller ID video insertion device.

FIG. 1A is an embodiment of a Caller ID video insertion device 100. The Caller ID video insertion device 100 is configured to receive Caller ID information associated with an incoming phone call, and insert the Caller ID information into a digital video stream and/or analog video signal using a visual timecode video insertion format. The Caller ID video insertion device 100 includes processor 102, memory 104, bridge interface 106, modem-Caller ID interface 108, and telephone line interfaces 110. The telephone line interfaces 110 include telephone line input interface 112 and telephone line output interface 114. The Caller ID video insertion device 100 further includes external display 116, integrated analog/digital video signal, and High-Definition Multimedia Interface (HDMI) interface control 118, video buffer and signal conditioning device 120, and digital video interfaces 122. Digital video interfaces 122 include digital video input interface 124 and digital video output interface 126. The Caller ID video insertion device 100 further includes RF coax control 128 and analog video interfaces 130. The analog video interfaces 130 include analog video input interface 132 and analog video output interface 134. The Caller ID video insertion device 100 further includes power interface and transformer 136.

Processor 102 is configured to retrieve computer readable instructions from memory 104 and execute the computer readable instructions to perform various functions and operations of the Caller ID video insertion device 100 described herein. In at least one embodiment, processor 102 is a central processing unit (CPU). The processor 102 and memory 104 are coupled to bridge interface 106. Bridge interface 106 is configured to allow signals to be exchanged between components coupled to the bridge interface 106. In at least one embodiment, bridge interface 106 is a bus configured to allow components coupled to the bridge interface 106 to communicate with each other. Bridge interface 106 is further coupled to modem-Caller ID interface 108, external display 116, and integrated analog/digital video signal, and HDMI interface control 118. Modem-Caller ID interface 108 is further coupled to telephone line interfaces 110. In at least one embodiment, telephone line interfaces 110 are RJ11 interfaces.

Integrated analog/digital video signal and HDMI interface control 118 is further coupled to video buffer and signal conditioning device 120, digital video interfaces 122, and RF coax control 128. In at least one embodiment, digital video interfaces 122 are HDMI interfaces. The RF coax control 128 is further coupled to analog video interfaces 130. In a particular embodiment, analog video interfaces 130 are RG58 coax interfaces. In a particular embodiment, any analog video interface control device may be used in place of the RF coax control 128. Power interface and transformer 136 is configured to provide power to various components of the Caller ID video insertion device 100. In a particular embodiment, power interface and transformer 136 receive power from an AC outlet, converts the AC power to DC, and provides the DC power to various components. In still other embodiments, the power interface and transformer 136 may receive power from one or more batteries.

The modem-Caller ID interface 108 is configured to receive an incoming phone call including caller identifier information associated with a calling device, demodulate and decode the caller identifier information, and send the caller identifier information to the integrated analog/digital video signal and HDMI interface control 118. In various embodiments, the call identifier information is Caller ID data including one or more of a phone number associated with the calling device and a caller name associated with the calling device. In some embodiments, the Caller ID information is encoded using one or more of the TR-TSY-000030 and TR-TSY-000031 Caller ID standards. The modem-Caller ID interface 108 is further configured to provide the incoming phone call to the telephone line output interface 114 substantially unchanged. A user may optionally couple a customer premise telephony device, such as a telephone, to the telephone line output interface 114 to allow the user to answer an incoming phone call or place an outgoing phone call using the customer premise telephony device.

The integrated analog/digital video signal and HDMI interface control 118 is configured to receive a digital video stream from the digital video input interface 124. In at least one embodiment, the integrated analog/digital video signal and HDMI interface control 118 includes at least one processor configured to perform the functions and operations of the integrated analog/digital video signal and HDMI interface control 118 described herein. In various embodiment, the digital video stream is an uncompressed digital video stream. In a particular embodiment, the digital video stream is an HDMI digital video stream. HDMI allows for the transmitting of an uncompressed digital video stream, for example, between a digital video source and a display device. The integrated analog/digital video signal and HDMI interface control 118 is further configured to convert the caller identifier information received from the modem-Caller ID interface 108 into caller identifying textual information. In a particular embodiment, the caller identifying textual information is a text image providing a visual indication of the caller identifier information received from the modem-Caller ID interface 108. In various embodiments, the caller identifying textual information may include one or more of a caller name associated with the calling device, a phone number associated with the calling device, or a nickname associated with a caller of the calling device converted from the caller identifier information received from the modem-Caller ID interface 108. In various embodiments, the Caller ID information associated with an incoming phone call is inserted into the digital video stream using a visual timecode video insertion format such as a BITC format.

The integrated analog/digital video signal and HDMI interface control 118 is further configured to insert the caller identifying textual information into the digital video stream using a visual timecode video insertion format. In various embodiments, the integrated analog/digital video signal and HDMI interface control 118 uses the video buffer and signal conditioning device 120 as a buffer when processing the digital video stream to insert the caller identifying textual information into the digital video stream. The visual timecode video insertion format is a human-readable graphic display format that allows a video time code to be overlayed on a digital video stream. In various embodiments, caller identifying textual information, instead of timecode information, is overlayed on, superimposed on, and/or inserted into the digital video stream using the visual timecode video insertion format. The visual timecode video insertion format allows the caller identifying textual information to be overlaid on the video images of the digital video stream as a human-readable indication of the identity of a caller. In at least one embodiment, the inserting of the caller identifying textual information includes replacing a portion of display pixels of one or more frames of the digital video stream by display pixels representing the caller identifying textual information during receipt of an incoming call. In a particular embodiment, the visual timecode video insertion format is a burnt-in timecode (BITC) standard. The BITC timecode standard allows a human readable onscreen version of textual information, such as timecode information, to be superimposed on a video image. In various embodiments, caller identifying textual information is inserted into a digital video stream instead of timecode information using the BITC format. A number of software applications exist that provide for the capability of inserting BITC timecode information into a video signal. Examples include Final Cut Pro by Apple Inc. and Adobe Premier Pro by Adobe Systems Incorporated. In some embodiments, these software applications may be modified to insert caller identifying textual information instead of timecode information into a digital video stream using a BITC format.

In some embodiment, the caller identifying textual information may be inserted into a lower right portion of the frames of the digital video stream for a predetermined time period upon an incoming call being received. In a particular embodiment, the caller identifying textual information may be inserted for 10 seconds after an incoming call is received. In an alternative embodiment, the caller identifying textual information may be inserted until either the incoming call is answered or the incoming call is disconnected without having been answered.

The integrated analog/digital video signal and HDMI interface control 118 is further configured to provide the digital video stream with inserted caller identifying textual information to the digital video output interface 126. The digital video output interface 126 is configured to be coupled to a display device for displaying the digital video stream with inserted caller identifying textual information to a user. In a particular embodiment, the display device is coupled to the digital video output interface 126 via a HDMI connector. HDMI allows for the transmitting of an uncompressed digital video stream, for example, between a digital video source and a display device. The modem-Caller ID interface 108 may further provide the caller identifier information associated with the calling device to the external display 116. The external display 116 is configured to display the caller identifier information from the incoming phone call to a user. In various embodiments, the Caller ID video insertion device 100 allows Caller ID messages to be viewed on a display with no limitations on the channel being watched and without having to deal with issues caused by encrypted digital video streams.

The RF coax control 128 is configured to receive an analog video signal from analog video input interface 132, and provide the analog video signal to the integrated analog/digital video signal and HDMI interface control 118. The integrated analog/digital video signal and HDMI interface control 118 is further configured to insert the caller identifying textual information into the analog video signal using a visual timecode video insertion format, such as the BITC format. The integrated analog/digital video signal and HDMI interface control 118 is further configured to provide the analog video signal with inserted caller identifying textual information to the RF coax control 128. The RF coax control 128 further transmits the analog video signal with inserted caller identifying textual information to the analog video output interface 134. Accordingly, the Caller ID video insertion device 100 is configured to insert Caller ID information into one or more of a digital video stream and an analog video signal in various embodiments. The analog video output interface 134 is configured to provide the analog video signal with inserted caller identifying textual information to an analog display device. In various embodiments, the analog video interfaces 130 are RG58 coax interfaces.

Figure 1B:
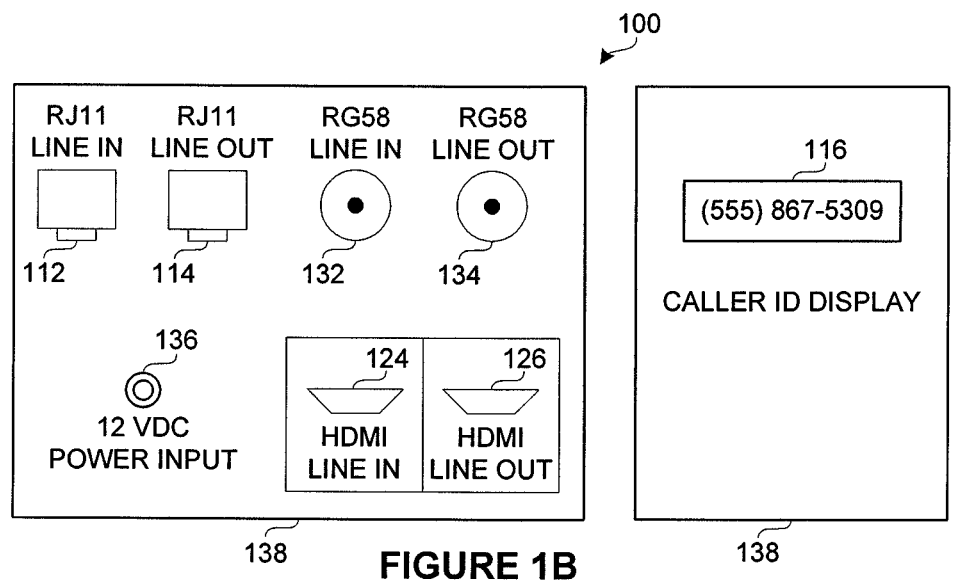
FIG. 1B is an external view of an embodiment of an enclosure for the Caller ID video insertion device.

FIG. 1B is an external view of an embodiment of an enclosure 138 for the Caller ID video insertion device 100. In the particular embodiment illustrated in FIG. 1B, the telephone line input interface 112 is an RJ11 line-in interface and the telephone line output interface 114 is an RJ11 line-out interface. The digital video input interface 124 is an HDMI line-in interface, and the digital video output interface 126 is an HDMI line-out interface. The analog video input interface 132 is an RG58 coaxial line-in interface, and the analog video output interface 134 is an RG58 coaxial line-out interface. The power interface and transformer 136 is a 12 volt DC power input, and the external display 116 is a Caller ID display configured to display Caller ID information associated with an incoming telephone call.

Figure 2:
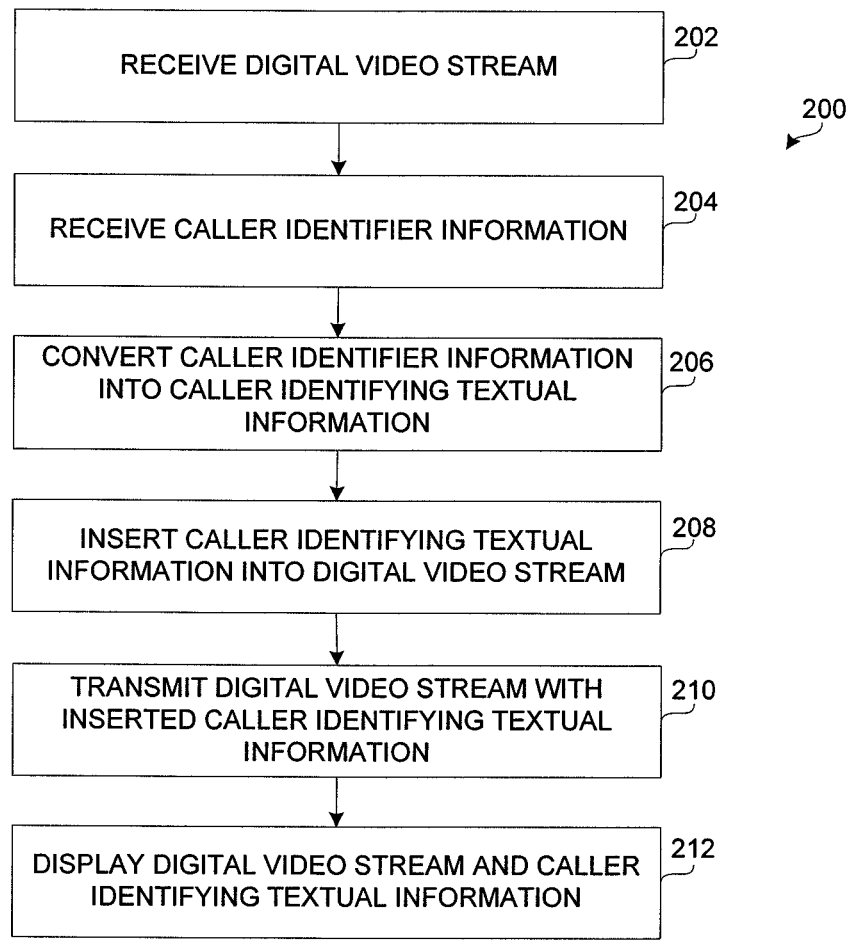
FIG. 2 is an embodiment of a procedure for inserting caller identifying information into a digital video stream.

FIG. 2 is an embodiment of a procedure 200 for inserting caller identifying information into a digital video stream. In step 202, a digital video stream is received by the Caller ID video insertion device 100. In various embodiments, the digital video stream is an uncompressed digital video stream. In a particular embodiment, the uncompressed digital video stream is an HDMI video stream received via an HDMI interface connection. In various embodiments, the digital video stream may be received from a cable or satellite set-top box, or other any other video source, such as a VCR, DVD player, DVR, Blu Ray disc player, a video game system, or a computer. In step 204, caller identifier information associated with an incoming phone call from a calling device is received by the Caller ID video insertion device 100. In some embodiments, the caller identifier information is Caller ID information obtained from the incoming phone call. In step 206, the Caller ID video insertion device 100 converts the caller identifier information into caller identifying textual information. In at least one embodiment, the caller identifying textual information includes one or more alphanumeric characters identifying one or more of the calling device and/or a caller associated with the calling device. In a particular embodiment, the caller identifying textual information may include a phone number, a caller name, or a caller nickname contained in the caller identifier information received from the incoming phone call. In step 208, the Caller ID video insertion device 100 inserts the caller identifying textual information into the digital video stream using a visual timecode video insertion format. The visual timecode video insertion format allows alphanumeric text or other textual information to be overlaid over an existing video signal, such as a digital video stream. In at least one embodiment, the visual timecode video insertion format is a BITC format. In step 210, the Caller ID video insertion device 100 transmits the digital video stream with inserted caller identifying textual information. In various embodiments, the digital video stream with inserted caller identifying textual information is transmitted to a display device. In at least one embodiment, the digital video stream with inserted caller identifying textual information is transmitted using an HDMI connection. In step 212, the video display device receives and displays the digital video stream and caller identifying textual information such that the caller identifying textual information is overlaid on the digital video stream. In various embodiments, the video display device may include a television, a monitor, or any other display device. In a particular embodiment, the video display device is a high definition television.

Figure 3:
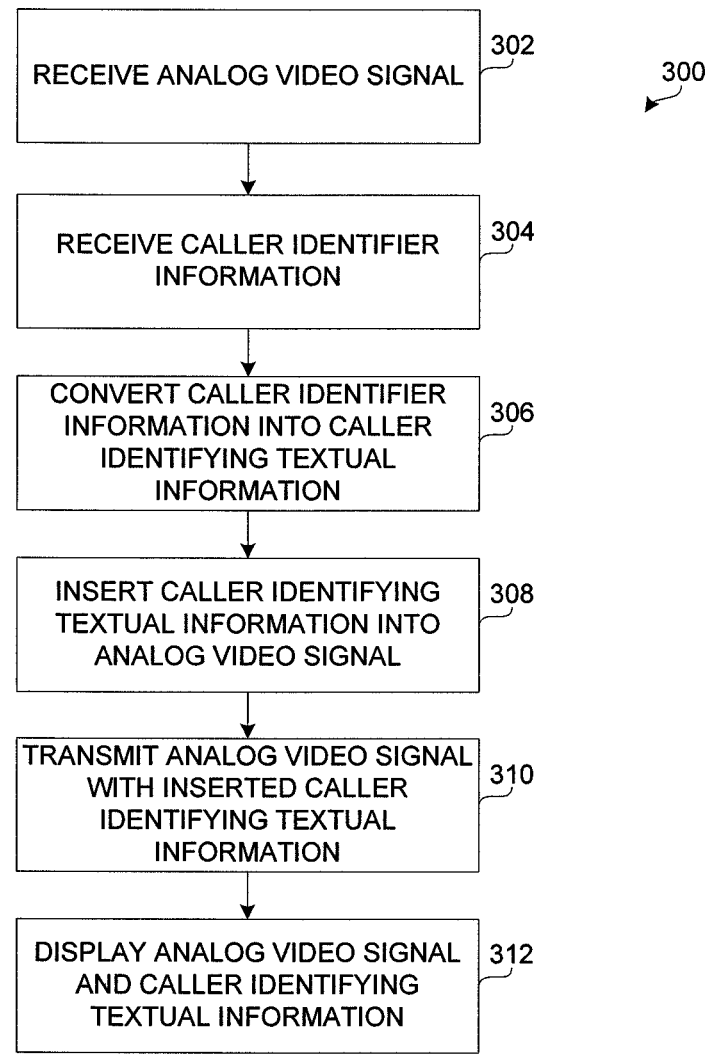
FIG. 3 is an embodiment of a procedure for inserting caller identifying information into an analog video signal.

FIG. 3 is an embodiment of a procedure 300 for inserting caller identifying information into an analog video signal. In step 302, an analog video signal is received by the Caller ID video insertion device 100. In a particular embodiment, the uncompressed digital video stream is received via an RG58 coaxial connection. In various embodiments, the analog video signal may be received from a service provider, from a cable or satellite set-top box or any other analog video source, such as a VCR, DVD player, DVR, Blue Ray disc player, a video game system, or a computer. In step 304, caller identifier information associated with an incoming phone call from a calling device is received by the Caller ID video insertion device 100. In various embodiments, the caller identifier information is Caller ID information obtained from the incoming phone call. In step 306, the Caller ID video insertion device 100 converts the caller identifier information into caller identifying textual information. In at least one embodiment, the caller identifying textual information includes one or more alphanumeric characters identifying one or more of the calling device or a caller associated with the calling device. In a particular embodiment, the caller identifying textual information may include a phone number, a caller name, or a caller nickname contained in the caller identifier information received from the incoming phone call. In step 308, the Caller ID video insertion device 100 inserts the caller identifying textual information into the analog video signal using a visual timecode video insertion format which allows alphanumeric text or other textual information to be overlaid over an existing analog video signal. In a particular embodiment, the caller identifying textual information is inserted into the analog video signal by combining an analog video overlay of the caller identifying textual information with the analog video signal. In an alternative embodiment, the analog video signal may be converted into a digital video stream and the caller identifying textual information may be inserted using a digital video insertion procedure such as described herein. The digital video stream with the inserted caller identifying textual information may then be converted back into an analog video signal having the inserted caller identifying textual information. In at least one embodiment, the visual timecode video insertion format is a BITC format.

In step 310, the Caller ID video insertion device 100 transmits the analog video signal with inserted caller identifying textual information. In various embodiments, the analog video signal with inserted caller identifying textual information is transmitted to a video display device. In at least one embodiment, the analog video signal with inserted caller identifying textual information is transmitted using an RG58 coaxial connection. In step 312, the video display device displays the analog video signal and caller identifying textual information, such that the caller identifying textual information is overlaid on the analog video signal. In various embodiments, the video display device may include a television, a monitor, or any other display device. In a particular embodiment, the video display device is a high definition television.

Figure 4:
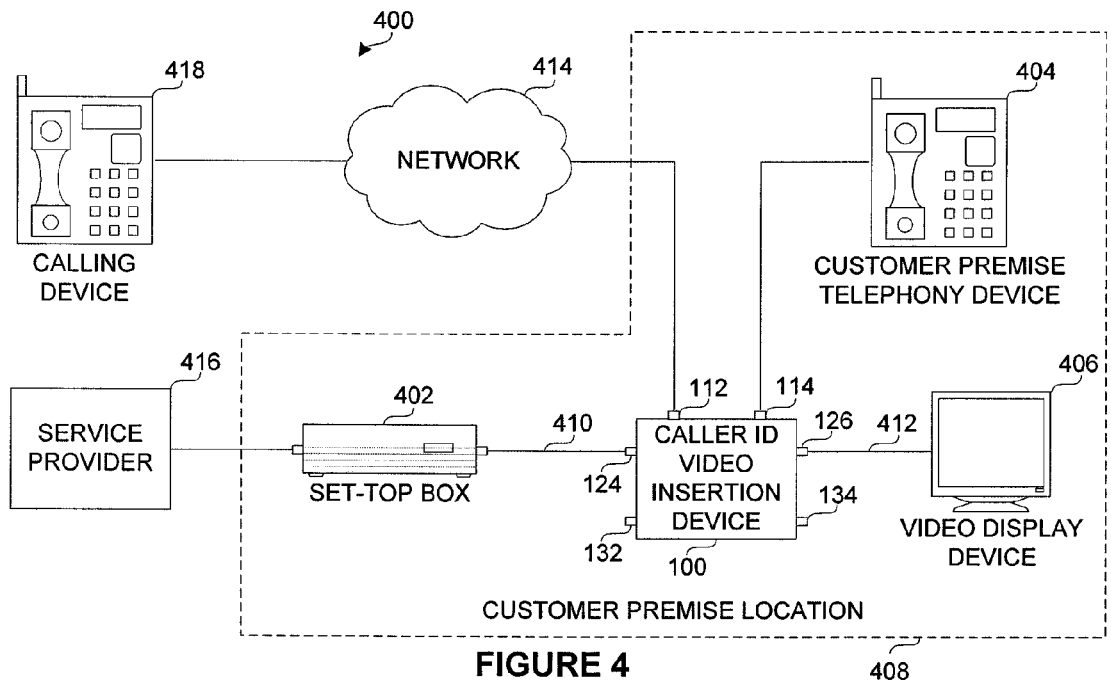
FIG. 4 is an embodiment of a system for inserting caller identifying information into a digital video stream.

FIG. 4 is an embodiment of a system 400 for inserting caller identifying information into a digital video stream. The system 400 includes a Caller ID video insertion device 100, a set-top box 402, a customer premise telephony device 404, and a video display device 406 located at a customer premise location 408. The set-top box 402 is coupled to the digital video input interface 124 of the Caller ID video insertion device 100 via a first digital video connection 410. In a particular embodiment, the first digital video connection 410 is an HDMI connection. The customer premise telephony device 404 is coupled to the telephone line output interface 114 of the Caller ID video insertion device 100. In a particular embodiment, the customer premise telephony device 404 is a telephone. The video display device 406 is coupled to the digital video output interface 126 of the Caller ID video insertion device 100 via a second digital video connection 412. In a particular embodiment, the second digital video connection 412 is an HDMI connection. The telephone line input interface 112 of the Caller ID video insertion device 100 is coupled to a network 414. In a particular embodiment, the network 414 is a public switched telephone network (PSTN).

The set-top box 402 receives a digital video stream from a service provider 416. The digital video stream may include, for example, a television program, a movie, or other video services provided by the service provider 416. In a particular embodiment, the service provider 416 is a cable television provider. In another embodiment, the set-top box 402 may be a satellite set-top box, and the service provider 416 may be a satellite television service provider. The set-top box 402 provides the digital video stream to the Caller ID video insertion device 100, and the Caller ID video insertion device 100 provides the digital video stream to the video display device 406. The video display device 406 may then display the digital video stream.

Upon receiving an incoming call from a calling device 418 addressed to the customer premise telephony device 404, the Caller ID video insertion device 100 receives caller identifier information associated with the incoming call, converts the caller identifier information into caller identifying textual information, and inserts the caller identifying textual information into the digital video stream using a visual timecode video insertion format. In at least one embodiment, the visual timecode video insertion format is a BITC standard format. The Caller ID video insertion device 100 then transmits the digital video stream with the inserted caller identifying textual information to the video display device 406. Upon receiving the digital video stream with inserted caller identifying textual information, the video display device 406 displays the digital video stream and caller identifying textual information. In a particular embodiment, the caller identifying textual information is overlaid on the digital video stream. In various embodiments, the digital video stream is an uncompressed digital video stream. In still other embodiments, the digital video stream may be a compressed digital video stream. In various embodiments, the connection of the customer premise telephony device 404 to the Caller ID video insertion device 100 is optional.

Figure 5:
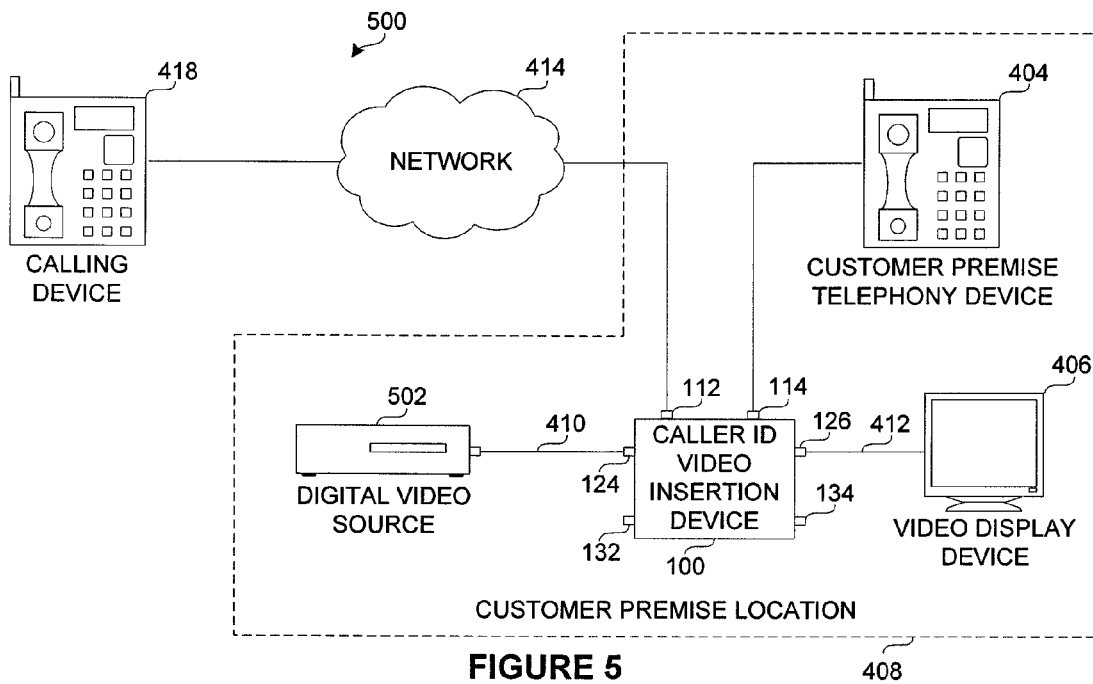
FIG. 5 is another embodiment of a system for inserting caller identifying information into a digital video stream.

FIG. 5 is another embodiment of a system 500 for inserting caller identifying information into a digital video stream. In the system 500 of FIG. 5, the set-top box 402 is replaced by a digital video source 502 configured to provide a digital video stream to the Caller ID video insertion device 100, and the service provider 416 is not necessary. In at least one embodiment, the digital video stream is an uncompressed digital video stream. In a particular embodiment, the digital video stream is an HDMI video stream. In various embodiments, the digital video source 502 may include any video source, including a VCR, a DVD player, a DVR, a Blue Ray disc player, a video game system, a computer, or any other digital video source. The digital video source 502 provides the digital video stream to the Caller ID video insertion device 100 and the Caller ID video insertion device 100 provides the digital video stream to the video display device 406. The video display device 406 may then display the digital video stream. Upon receiving an incoming call from a calling device 418, addressed to the customer premise telephony device 404, the Caller ID video insertion device 100 receives caller identifier information associated with the incoming call, converts the caller identifier information into caller identifying textual information, and inserts the caller identifying textual information into the digital video stream using a visual timecode video insertion format. The Caller ID video insertion device 100 then transmits the digital video stream with the inserted caller identifying textual information to the video display device 406. Upon receiving the digital video stream with inserted caller identifying textual information, the video display device displays the digital video stream and caller identifying textual information.

Figure 6:
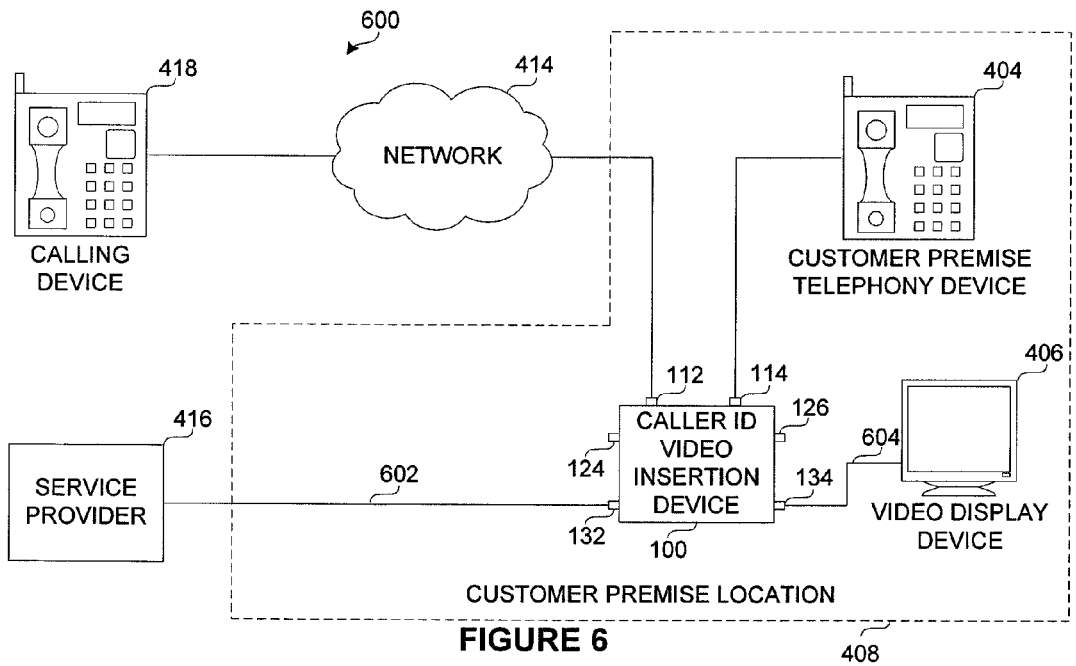
FIG. 6 is an embodiment of a system for inserting caller identifying information into an analog video signal.

FIG. 6 is an embodiment of a system 600 for inserting caller identifying information into an analog video signal. In the system 600 of FIG. 6, the service provider 416 is coupled to the analog video input interface 132 of the Caller ID video insertion device 100 via a first analog video connection 602. In a particular embodiment, the service provider 416 is a cable television provider. In a particular embodiment, the first analog video connection 602 is an RG58 coaxial connection. The service provider 416 provides an analog video signal to the Caller ID video insertion device 100 via the first analog video connection 602. The analog video signal may include, for example, a television program, a movie, or other video services provided by the service provider 416. The Caller ID video insertion device 100 then provides the analog video signal to the video display device 406 via a second analog video connection 604. In various embodiments, the second analog video connection 604 may include an RG58 connection, an RCA connection, a composite video connection, a component video connection, or any analog video connection.

Upon receiving an incoming call from a calling device 418 addressed to the customer premise telephone device 404, the Caller ID video insertion device 100 receives caller identifier information associated with the incoming call, converts the caller identifier information into caller identifying textual information, and inserts the caller identifying textual information into the analog video stream using a visual timecode video insertion format. In at least one embodiment, the visual timecode video insertion format is a BITC standard format. The Caller ID video insertion device 100 then transmits the analog video signal with the inserted caller identifying textual information to the video display device 406. Upon receiving the analog video signal with inserted caller identifying textual information, the video display device displays the analog video stream and caller identifying textual information. In a particular embodiment, the caller identifying textual information is overlaid on the analog video signal.

Figure 7:
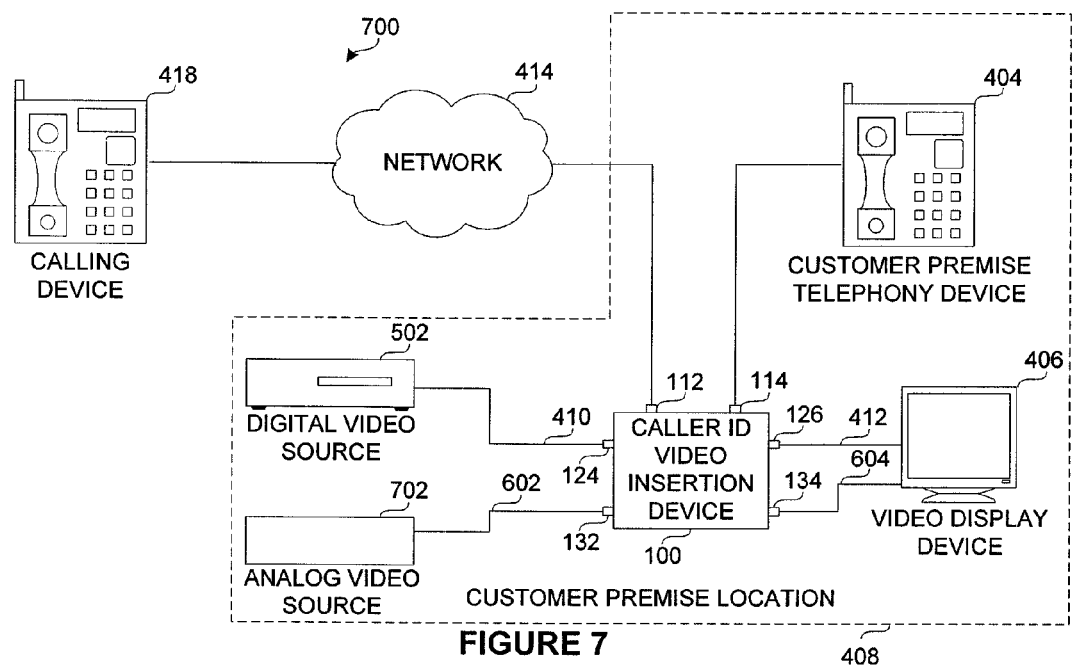
FIG. 7 is an embodiment of a system for inserting caller identifying information into a digital video stream and an analog video signal.

FIG. 7 is an embodiment of a system 700 for inserting caller identifying information into a digital video stream and an analog video signal. In system 700 of FIG. 7, a digital video source 502 is coupled to the digital video input interface 124 of the Caller ID video insertion device 100 via a first digital video connection 410. An analog video source is coupled to the; analog video input interface 132 of the Caller ID video insertion device 100 via a first analog video connection 602. The digital video source 502 provides a digital video stream to the Caller ID video insertion device 100, and the analog video source 702 provides an analog video signal to the Caller ID video insertion device 100. The digital video output interface 126 of the Caller ID video insertion device 100 is coupled to a digital input of the video display device 406 by a second digital video connection 412. The analog video output interface 134 of the Caller ID video insertion device 100 is coupled to an analog input of the video display device 406 via a second analog connection 604.

The Caller ID video insertion device 100 is configured to receive caller identifier information associated with an incoming phone call, convert the caller identifier information into caller identifying textual information, and insert the caller identifying textual information into both the digital video stream and the analog video signal using a visual timecode video insertion format. The Caller ID video insertion device 100 transmits the digital video stream and analog video signal each with inserted caller identifying textual information to the video display device 406. Accordingly, a user of the video display device 406 may view the caller identifying textual information using the video display device 406 regardless of whether the user is currently viewing video from the digital video source 502 or the analog video source 702. In an alternative embodiment, the digital video source 502 and analog video source 702 may be coupled to respective digital and audio video inputs of an audio visual (AV) receiver, and the digital video input interface 124 and the analog video input interface 132 may be coupled to respective digital and audio outputs of the AV receiver. Accordingly, regardless of whether the AV receiver is selected to display either digital video or analog video, the caller identifying textual information associated with an incoming call may be viewed on the video display device 406.

The illustrative embodiments can take the form of an entirely hardware embodiment, an entirely software embodiment, or an embodiment containing both hardware and software elements. Furthermore, the illustrative embodiments can take the form of a computer program product accessible from a computer-usable or computer-readable medium providing program code for use by or in connection with a computer or any instruction execution system. For the purposes of this description, a computer-usable or computer-readable medium can be any tangible apparatus that can contain, store, communicate, propagate, or transport the program for use by or in connection with the instruction execution system, apparatus, or device.

The computer-usable or computer-readable medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk, and an optical disk. Current examples of optical disks include compact disk-read only memory (CD-ROM), compact disk-read/write (CD-R/W), and DVD.

Further, a computer storage medium may contain or store a computer-readable program code, such that when the computer-readable program code is executed on a computer, the execution of this computer-readable program code causes the computer to transmit another computer-readable program code over a communication link. This communication link may use a medium that is, for example, without limitation, physical, or wireless.

The previous detailed description is of a small number of embodiments for implementing the invention and is not intended to be limiting in scope. One of skill in this art will immediately envisage the methods and variations used to implement this invention in other areas than those described in detail. The following claims set forth a number of the embodiments of the invention disclosed with greater particularity.

What is claimed as new and desired to be protected by Letters Patent of the United States is:

1. A method for inserting caller identifying information into a video signal comprising:
   receiving a digital video stream and an analog video stream at a caller identification (ID) video insertion device;
   receiving caller identifier information from an incoming call associated with a calling device, wherein the caller identifier information is extracted from the incoming call by the caller ID video insertion device;
   converting the caller identifier information into caller identifying textual information;
   inserting the caller identifying textual information converted from the caller identifier information in the incoming call into both the digital video stream and the analog video stream using a visual timecode video insertion format, the visual timecode video insertion format having the caller identifying textual information in place of timecode information, utilizing the caller ID video insertion device; and
   transmitting both the digital video stream and the analog video stream with the inserted caller identifying textual information from the caller ID video insertion device to a video display device as a first video connection and a second video connection, respectively, wherein the inserted caller identifying textual information overlays both the digital video stream and the analog video stream for viewing by a user, the caller ID video insertion device is configured to display the caller identifying textual information to the video display device regardless of a user selection to view the digital video stream or the analog video stream, and the caller ID video insertion device is further configured to display the caller identifying textual information until one of the incoming call is answered and the incoming call is disconnected.

2. The method of claim 1, wherein the visual timecode video insertion format is a burnt-in timecode format.

3. The method of claim 1, further comprising:
   receiving the digital video stream with inserted caller identifying textual information by the video display device; and
   displaying the digital video stream including the inserted caller identifying textual information by the video display device.

4. The method of claim 1, wherein the inserted caller identifying textual information replaces a portion of display pixels of the digital video stream.

5. The method of claim 1, wherein the digital video stream is an uncompressed digital video stream.

6. The method of claim 5, wherein the uncompressed digital video stream is a high-definition multimedia interface (HDMI) digital video stream.

7. The method of claim 1, wherein the caller identifier information is extracted by demodulating and decoding the incoming call.

8. The method of claim 7, wherein the digital video stream and analog video stream are enabled to be received through any of a satellite provider, a cable provider, and a satellite provider.

9. The method of claim 1, wherein the caller identifying textual information includes at least one of a phone number associated with the calling device and a caller name associated with the calling device.

10. The method of claim 1, wherein the caller identifier information includes Caller ID information including at least (1) a name or a nickname, and (2) a phone number or calling identifier.

11. An apparatus for inserting caller identifying information into a video signal comprising:
   at least one microprocessor;
   system memory comprising a non-transitory computer readable medium having stored thereon a set of instructions when executed by the at least one microprocessor cause the microprocessor to:
      receive a digital video stream and an analog video stream;

receive caller identifier information from an incoming call associated with a calling device, wherein the caller identifier information is extracted from the incoming call to the calling device;

convert the caller identifier information into caller identifying textual information;

insert the caller identifying textual information converted from the caller identifier information in the incoming call into both the digital video stream and the analog video stream using a visual timecode video insertion format, the visual timecode video insertion format having the caller identifying textual information in place of timecode information; and transmit both the digital video stream and the analog video stream with the inserted caller identifying textual information to a display as a first video connection and a second video connection, respectively, wherein the inserted caller identifying textual information overlays both the digital video stream and the analog video stream for viewing by a user, the apparatus is configured to display the caller identifying textual information to the display regardless of a user selection to view the digital video stream or the analog video stream, and the apparatus is further configured to display the caller identifying textual information until one of the incoming call is answered and the incoming call is disconnected.

12. The apparatus of claim 11, wherein the visual timecode video insertion format is a burnt-in timecode format.

13. The apparatus of claim 11, wherein the video display device is configured to display the digital video stream and caller identifying video signal.

14. The apparatus of claim 13, wherein the inserted caller identifying textual information replaces a portion of display pixels of the digital video stream.

15. The apparatus of claim 11, wherein the digital video stream is an uncompressed digital video stream.

16. The apparatus of claim 15, wherein the uncompressed digital video stream is a High-Definition Multimedia Interface (HDMI) digital video stream.

17. The apparatus of claim 11, wherein the caller identifier information is extracted by demodulating and decoding the incoming call.

18. The apparatus of claim 17, wherein the digital video stream and analog video stream are enabled to be received through a satellite provider, a cable provider, and a satellite provider and cable provider.

19. The apparatus of claim 11, wherein the caller identifying textual information includes at least one of a phone number associated with the calling device and a caller name associated with the calling device.

20. The apparatus of claim 11, wherein the caller identifier information includes Caller ID information including at least (1) a name or a nickname, and (2) a phone number or calling identifier.

* * * * *